(12) United States Patent
Salokatve

(10) Patent No.: US 9,081,143 B2
(45) Date of Patent: Jul. 14, 2015

(54) PACKAGED FIBER-OPTIC COMPONENT AND METHOD OF MANUFACTURING THEREOF

(75) Inventor: Arto Salokatve, Tampere (FI)

(73) Assignee: Rofin-Sinar Laser GmbH, Hamburg (DE)

( * ) Notice: Subject to any disclaimer, the term of this patent is extended or adjusted under 35 U.S.C. 154(b) by 83 days.

(21) Appl. No.: 13/824,391

(22) PCT Filed: Oct. 20, 2011

(86) PCT No.: PCT/FI2011/050916
§ 371 (c)(1),
(2), (4) Date: May 31, 2013

(87) PCT Pub. No.: WO2012/052620
PCT Pub. Date: Apr. 26, 2012

(65) Prior Publication Data
US 2013/0272657 A1    Oct. 17, 2013

(30) Foreign Application Priority Data

Oct. 21, 2010 (FI) ..................................... 20106091

(51) Int. Cl.
*G02B 6/26* (2006.01)
*G02B 6/34* (2006.01)
(Continued)

(52) U.S. Cl.
CPC . *G02B 6/26* (2013.01); *C03B 19/00* (2013.01); *G02B 6/24* (2013.01); *G02B 6/262* (2013.01);
(Continued)

(58) Field of Classification Search
CPC .. G02B 6/3801; G02B 6/4201; G02B 6/4214; G02B 6/24; G02B 6/26; G02B 6/2821; G02B 6/36; Y10T 29/49826; C03B 19/00

USPC ............... 385/31, 33, 39, 95–99, 123, 27, 43, 385/49–52, 55, 71; 65/17.1
See application file for complete search history.

(56) References Cited

U.S. PATENT DOCUMENTS

| 5,291,570 | A |   | 3/1994 | Filgas et al. |
| 5,431,647 | A | * | 7/1995 | Purcell et al. .................. 606/16 |

(Continued)

FOREIGN PATENT DOCUMENTS

| DE | 4305313 C1 | 3/1994 |
| GB | 2255199 A | 10/1992 |

(Continued)

OTHER PUBLICATIONS

Finnish search report, Aug. 24, 2013.
(Continued)

*Primary Examiner* — Akm Enayet Ullah
*Assistant Examiner* — Michael Mooney
(74) *Attorney, Agent, or Firm* — Laurence A. Greenberg; Werner H. Stemer; Ralph E. Locher

(57) ABSTRACT

The invention concerns a fiber-optic component, in particular a fiber coupler, and method for manufacturing thereof. The component comprises a housing (25), at least one first optical element (21) capable of guiding light and having an output end, the first optical element (21) being affixed to said housing (25) at a mounting zone (26A), and at least one second optical element (22, 23) optically coupled to the first optical element (21) at a coupling zone (27) for receiving light from the output end of the first optical element (21). According to the invention, the component comprises at least one zone (29) of light-scattering material arranged in the vicinity of the first optical element (21) at a region between the coupling zone (27) and the mounting zone (26A). By means of the invention, the effect potentially harmful reverse radiation in fiber-optic components can be mitigated.

13 Claims, 2 Drawing Sheets

(51) Int. Cl.
  *G02B 6/42*   (2006.01)
  *C03B 19/00*  (2006.01)
  *G02B 6/24*   (2006.01)
  *G02B 6/30*   (2006.01)
  *G02B 6/36*   (2006.01)
  *G02B 6/28*       (2006.01)

(52) U.S. Cl.
  CPC  *G02B 6/305* (2013.01); *G02B 6/36* (2013.01); *G02B 6/2821* (2013.01); *Y10T 29/49826* (2015.01)

(56) References Cited

U.S. PATENT DOCUMENTS

| | | | |
|---|---|---|---|
| 6,270,492 B1 * | 8/2001 | Sinofsky | .................. 606/15 |
| 6,535,671 B1 | 3/2003 | Poole | |
| 6,546,169 B1 | 4/2003 | Lin | |
| 7,492,993 B2 | 2/2009 | Nakai | |
| 7,963,666 B2 | 6/2011 | Leung et al. | |
| 2003/0103753 A1 | 6/2003 | Cabot et al. | |
| 2005/0025418 A1 | 2/2005 | Brown | |
| 2006/0261360 A1 | 11/2006 | Takehashi et al. | |
| 2007/0172174 A1 | 7/2007 | Scerbak et al. | |
| 2008/0193093 A1 | 8/2008 | DiGiovanni et al. | |
| 2010/0142894 A1 | 6/2010 | Gonthier | |

FOREIGN PATENT DOCUMENTS

| | | |
|---|---|---|
| JP | 2007201392 A | 8/2007 |
| JP | 2008275996 A | 11/2008 |
| JP | 2009543335 A | 12/2009 |

OTHER PUBLICATIONS

International search report, Feb. 7, 2012.

* cited by examiner

PACKAGED FIBER-OPTIC COMPONENT AND METHOD OF MANUFACTURING THEREOF

FIELD OF THE INVENTION

The invention relates to fiberoptic components and, in particular, their packaging. The invention relates also to a method of manufacturing a fiber-optic component. The invention is especially suitable for preventing failures of high-power laser components.

BACKGROUND OF THE INVENTION

Fiber lasers and fiber amplifiers can now be operated at high power levels ranging from hundreds of watts to kilowatts of optical power. Such laser sources have many industrial applications, such as marking, cutting and welding of various materials. High power fiber lasers and amplifiers are all-silica structures making them robust against environmental factors. They also require only minimal service, in contrast to other laser types used in industry.

An optical resonator cavity of a fiber laser is generally built from components, such as gain fiber, fiber Bragg gratings, and pump couplers that are spliced together to form the cavity. While the cavity construction is generally all-glass, meaning that the laser signal radiation inside the resonator is confined inside silica glass at all times, there are situations where some of the radiation leaks out from a glass component into free space. As an example, some constructions of a pump coupler are such that part of the radiation that gets introduced into the coupler in reverse direction, i.e. direction opposite to that of pump radiation, leaks out from the glass-construction of the component into free-space air. The reverse radiation may be introduced e.g. by back-reflection from the materials processing target, or from radiation that is coupled into the cladding of the gain fiber. The power of radiation introduced into free-space within the package of a component may easily be tens to hundreds of watts in a high-power fiber laser operating at kW power levels.

Exemplary coupler and structures are disclosed e.g. in US 2010/0142894, U.S. Pat. No. 7,492,993 and U.S. Pat. No. 6,546,169.

The free-space radiation introduced inside the package of a component is a potential risk for the component. To be more specific, the all-glass component is generally fixed to a housing in order to protect the component from mechanical or environmental factors. Fixing of the component is generally done with a glue or some other polymer material. When the free-space radiation hits the polymer, it gets at least partially absorbed there. The polymer has relatively poor thermal conductivity, and gets therefore heated up by the absorbed radiation. Heating may be so severe that the temperature of the polymer exceeds the failure temperature of the polymer. This situation will lead to runaway process of temperature, charring of the polymer, and eventually melting of the glass of the component. In other words, the component is destroyed, and the fiber laser the component is part of also fails.

An exemplary fiber-optic coupler structure is shown in FIG. 1a, which represents prior art. It comprises a plurality of input fibers 11 (two of which are shown), a coupling structure 12, and an output fiber 13. Optical radiation in the reverse direction (arrow 18') is incident to the coupler from the output fiber. This radiation may be due to unabsorbed pump radiation from the other side of the cavity, cladding radiation originated at fiber splices or other imperfections, or back-reflections from the target material when the fiber laser is used in real-world applications. A large fraction of this radiation may propagate in the glass cladding of the output fiber. The reverse propagating radiation spreads inside the glass structure of the coupling structure 12 (arrows 18"). When the radiation reaches the end surface of the coupling structure, part of it radiates into free space between and outside of the input fibers, as shown in FIG. 1a (arrows 18'''). This is due to the fact that while the component is generally designed to operate with high transmission of radiation in the forward direction, the transmission in reverse direction is usually not nearly as good. Since the reverse propagating radiation may be of low numerical aperture or low divergence, the portion of it radiating into free space may form an almost collimated beam of light.

FIG. 1b shows a packaged fiber-optic coupler. The package 15 is typically made of metal, and it has a groove or slit into which the component is mounted. The coupler is fixed to the housing from both ends with polymer zones 16A, 16B which is optical epoxy or alike glue material. Free-space reverse radiation 18 from the coupling structure is propagating towards the glue on the input fiber end of the package, and part of the free-space reverse radiation 18 hits the glue, and gets absorbed by it. It should be noted that even though clear optical epoxies are used as a glue, their absorption is still sufficiently high for the absorbed radiation to be able to heat the glue to high temperatures. This is particularly true for couplers operating in high power fiber laser systems, where the power of the free-space radiation may be several tens of Watts. Often the free-space radiation is also pretty collimated and may thus produce power densities in the range of $kW/cm^2$. Therefore, even if the glue is heat sunk to the housing, the glue may be severely heated by the radiation. The failure temperatures of typical optical glues are around 100° C., above which the thermal runaway can happen. The temperature of failure may be defined by the glass transition temperature of the polymer, or by temperature dependent absorption characteristics of the material. The failure may be visible as the collapsing of physical strength of the polymer or by thermal runaway and eventual charring of the material. Both processes usually lead to the failure of the fragile glass component.

US 2003/0103753 discloses a packaged optical coupling device which contains a quartz substrate suspended on lateral sides of the packaged component and designed to transport leaked light energy away from the packaged component and towards the housing of the component, where it is absorbed. Thus, this solution is essentially based on increasing the gap between the component and its housing using transparent glass in order to reduce the local intensity of the light absorbed to the housing. This solution has the disadvantage of increasing the dimensions of the package and not protecting the device from reverse radiation leaked parallel to the fibers of the device. In particular the area, where the fibers are mounted to the package, is not protected from reverse radiation.

SUMMARY OF THE INVENTION

It is an aim of the present invention to achieve a packaging and a method of packaging for fiber-optic components by means of which the deleterious effects of the free-space reverse radiation can be prevented or greatly mitigated.

The aim of the invention is achieved by the product and method according to the independent claims.

The fiber-optic component according to the invention comprises
  a housing,
    at least one first optical element capable of guiding light and having an output end, the first optical element being affixed to said housing at a mounting zone,
  at least one second optical element optically coupled to the first optical element at a coupling zone for receiving light from the output end of the first optical element, at least one zone of light-scattering material arranged in the vicinity of the first optical element at a region between the coupling zone and the mounting zone.

There may be one, or preferably a plurality of optical fibers, as the first optical element(s), from which light is coupled to the second optical element, which may comprise a single output fiber. There may be a tapering coupling element connecting the input and output fibers.

The housing may be a metal package or any other body supporting and/or protecting the optical elements arranged inside of it.

Advantageous embodiments of the invention are the subject of the dependent claims.

The invention also provides a novel use of particle-type scattering agent, such as $SiO_2$, $Al_2O_3$ or $TiO_2$, in a package of a fiber-optic coupler having an input side and an output side for scattering reverse radiation at the input side of the coupler.

Considerable advantages are obtained by means of the invention. Most importantly, the invention can be used to ensure that the temperature of the glue regions of the component stay well below the maximum allowable temperature of the glue material. Otherwise there is a risk for catastrophic component failure due to thermal runaway of the glue temperature. Experience has shown that a major failure mechanism of the glue is caused by the free-space radiation inside the component package. Therefore, the invention solves the problem of avoiding the deleterious effects of free-space radiation.

The solution according to the invention can be used in all existing structures having a zone of free radiation between the input optical element and its package to prevent the effects of reverse radiation. Manufacturing is also relatively easy and the additional cost of the invention is low.

The invention is directed, in particular, to fiber-optic components operating in the 100 W to kW power regime. In particular, the throughput of the component may be at least 100 W, in particular at least 1 kW and it may be coupled to a corresponding energy source.

Particular advantages are obtained in components directed to or used in laser welding and laser cutting, as the effective power level, and hence the reverse radiation level, is high in these applications.

The input fibers of the component may be, or may be coupled to, fiber lasers. According to one embodiment, the component is a fiber laser pump coupler. However, the present principles can be applied in any packaged fiber-optic component in which the portion of reverse radiation is significant, in particular at least 2%, typically at least 5% (in terms of intensity vs. incident light). In some cases, the portion of reverse radiation can be 10% or even higher.

In terms of absolute power, in a typical pump coupler, the power of the incident light is at least 1 kW and the power of reverse radiation is at least 50 W.

The term "scattering material" is used to refer to any material, combination of materials and order of material(s) capable of scattering light, i.e. to distribute incident light hitting the material randomly. The term "scattering agent" refers to a specific substance in the scattering material that has the property of scattering light. The scattering material may comprise one or more scattering agents in various forms. However, according to a preferred embodiment explained in more detail below, the scattering material comprises, and in some embodiments is essentially comprised of, particle-type inorganic scattering agent in a porous structure. The scattering material is also preferably essentially optically non-absorbing to avoid excessive heating of the scattering material itself.

The term "mounting zone" refers to a zone in the device which mechanically attaches the fiber component to its housing (or package).

"Coupling zone" refers to any structure optically coupling two fiber optic components to each other the typically to a splicing between two fiber-optic elements. Typically at least portion of the reverse radiation is leaked out of the components from the coupling zone. The reverse radiation may, in general, be at least partly due to unabsorbed pump radiation from the other side of the cavity, cladding radiation originated at fiber splices or other imperfections, or back-reflections from the target material the fiber-guided laser light is directed to, to mention some sources.

Next, embodiments of the invention are described in more detail with reference to the attached drawings.

DETAILED DESCRIPTION OF EMBODIMENTS

The invention can be used in fiber optic couplers, for example. The coupler may be an N to 1 coupler, where N≥2.

Figure 1A:
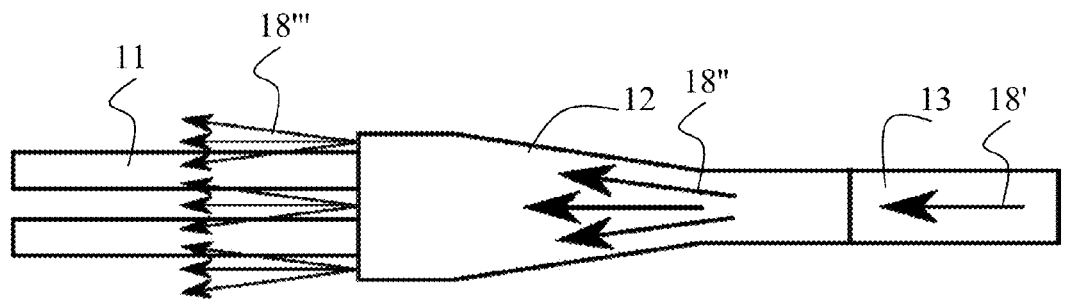
FIGS. 1a and 1b show an unpackaged (a) packaged (b) fiber-optic coupler according to prior art.
Figure 1B:
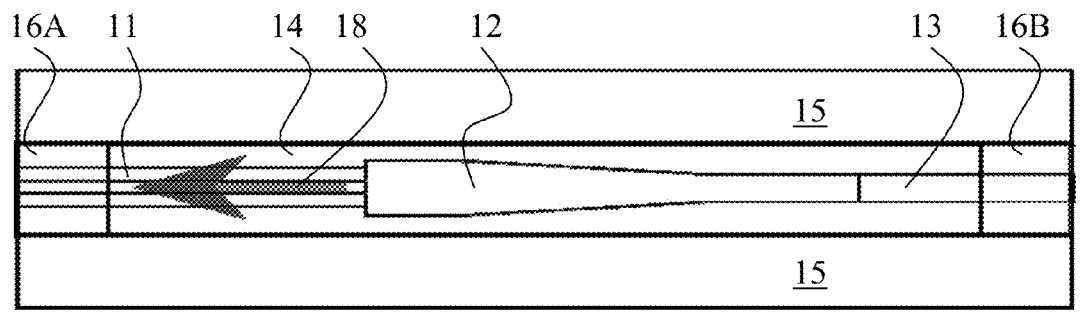
Figure 2:
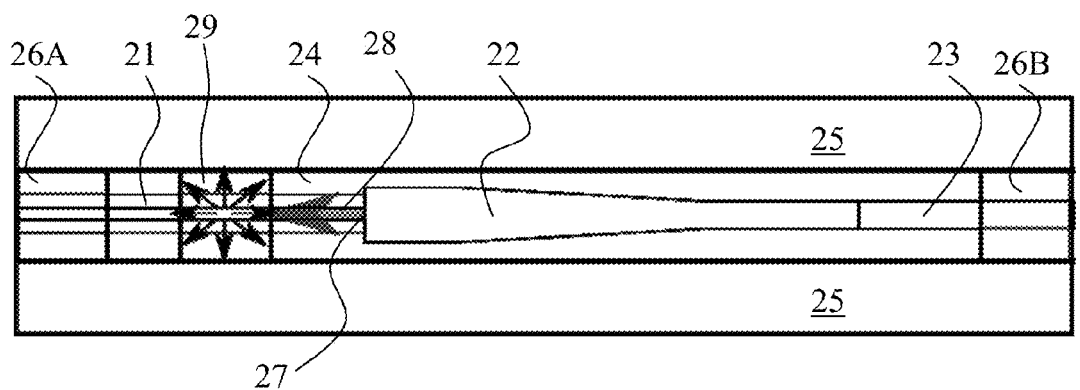
FIG. 2 illustrates a packaged fiber-optic component according to one embodiment of the invention.

FIG. 2 shows a packaged fiber-optic coupler according to one embodiment of the invention. The component comprises a plurality of input fibers 21 (two shown) spliced at their output end with a tapering coupler portion 22, which is further spliced to an output fiber 23. The whole structure is positioned inside a package 25 so that free space 24 remains between the optical components 21, 22 and 23 of the coupler and the package 25. On each end of the package, there are provided glue regions 26A, 26B for affixing the coupler to the package 25. The arrow 28 is used to denote the free-space radiation propagating in the reverse direction (right to left in FIG. 2) with respect to the incident light (from left to right).

In the described structure, most of the free space radiation exits to the free space 24 at the coupling zone between the input fibers 21 and the coupler portion 22. According to the invention, for avoiding or mitigating the deleterious effects of the free-space radiation scattering material 29 is arranged into the free space between the glue region 26A on the input fiber 21 end of the package and the coupler body 22. The scattering material agent prevents the free-space radiation from entering the glue region 26A, at least in its full intensity due to its ability to direct a significant portion of the light out of the core of the component. Thus, the radiation power directed to the glue region 26A is reduced.

The input and/or the output fibers are preferably cladded fibers, in particular single- or double-clad fibers. The scattering agent can be arranged to be in touch with the glass cladding of the input fibers.

In the case of a fiber laser pump coupler, the input fibers may be multimode pump fibers, or more generally, any kinds of fibers. In the case of a N-to-1 (N≥2) fiber coupler, the fibers may be comprise any kinds of fiber-type light guides.

According to one embodiment, the scattering material comprises, or is essentially comprised of, of inorganic material, preferably in particle form. Suitable scattering agents are, for example $SiO_2$, $Al_2O_3$ and $TiO_2$.

According to one embodiment, the scattering material has a high transparency, that is, preferably at least 90%, in particular at least 97% for the wavelength(s) of light used, preferably at least for all near infrared wavelengths.

According to one embodiment, the scattering material is itself non-absorbing, for reducing the heat load in the zone of scattering material. This can be achieved by using a high-purity scattering agent. The purity is preferably at least 95%.

Figure 3:
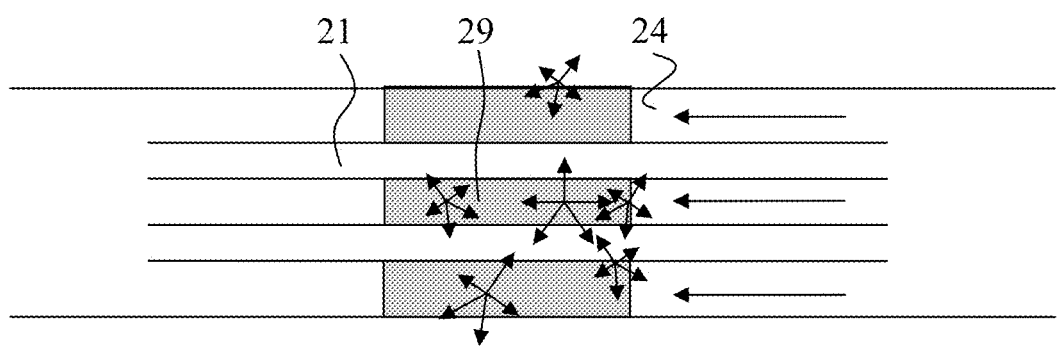
FIG. 3 illustrates the working principle of particle-type scattering agent around optical fibers.

According to one embodiment, the zone of scattering material scatters radiation to all directions, preferably omnidirectionally, i.e. with the same intensity irrespective of the direction. This can be achieved by using a plurality of small scattering particles, which cause the radiation to scatter a plurality of times from particle to particle and finally out of the scattering material. Thus, the material will efficiently scatter any free-space radiation incident on it into all spatial directions. Thus, the initially collimated radiation becomes diffuse with almost uniform angular power distribution. Most of the power in the free-space radiation will thus be deposited to the housing material, and gets dissipated there by either active or passive cooling used in the housing. FIG. 3 illustrates this principle.

These abovementioned preferred properties of the scattering material make the power density of radiation hitting the glue significantly smaller compared to a situation when no scattering agent is used. Thus, the damage threshold for reverse radiation of the component is further greatly increased.

The scattering agent is preferably composed of small particles of the scattering material. The particle size is not a very critical parameter, and it can be, for example, between 100 nm and 10 μm. Other particle sizes may also be used and the mentioned size range should not be taken as a restriction for this invention.

To aid in dispensing the scattering agent into the housing, the housing may be designed to have a feature where the scattering agent is inserted. The feature may limit the distribution of the scattering agent in the longitudinal direction of the component. One example of this feature is a recess or widening in a groove of the housing which is intended for the component, the recess or groove being capable of holding the scattering agent in place.

Next, an example of manufacturing of the scattering zone is given.

First, the scattering agent is mixed with a volatile component, such as pure ethanol, isopropyl alcohol, or water, to form a slurry which is easy to dispense to the proper location in the housing. Next, the slurry is introduced to the relevant portion of the housing preferably after the fiber-optic component has been inserted into the housing. After that, the volatile component is evaporated away, leaving a porous but non-flowing region of scattering agent that will stay in place by small attractive interactions between the particles of the scattering agent.

Since the scattering material as a whole is of high purity, the absorption of optical radiation is minimal, and the scattering agent does not get heated to the extent that it would be a risk to the optical component.

The scattering agent is preferably placed to the region of the component where there is no polymer, and thus in this region the maximum temperature limit can be set to much higher values than in the glue region 26A. Even so, practice has shown that by using pure materials in the scattering agent, temperature increase of the scattering region by the reverse radiation is very minimal.

The steps of joining of the input and output fibers in order to make an operable fiber coupler are not discussed herein in detail as such, because suitable splicing techniques are known per se.

The embodiments and examples given above, as well as the attached drawings, are given for illustrative purposes and do not limit the invention, which should be interpreted in the full scope of the following claims taking equivalents into account.

The invention claimed is:

1. A fiber-optic component comprising
   a housing,
   at least one first optical element capable of guiding light and having an output end, the first optical element being affixed to said housing at a mounting zone,
   at least one second optical element optically coupled to the first optical element at a coupling zone for receiving light from the output end of the first optical element, and
   at least one zone of light-scattering material arranged in the vicinity of the first optical element at a region between the coupling zone and the mounting zone, said light-scattering material comprising a particle-type light-scattering agent forming a porous structure.

2. The fiber-optic component according to claim 1, wherein the mounting zone comprises polymer material, such as epoxy, applied between the housing and the first optical element.

3. The fiber-optic component according to claim 1, wherein the zone of light-scattering material essentially fills the space between the housing and the first optical element at least on certain length of said region between the coupling zone and the mounting zone.

4. The fiber-optic component according to claim 1, wherein said light-scattering material comprises particle-type light-scattering agent.

5. The fiber-optic component according to claim 4, wherein said light-scattering agent is inorganic material.

6. The fiber-optic component according to claim 4, wherein said light-scattering agent has an average particle size between 100 nm and 10 μm.

7. The fiber-optic component according to claim 1, wherein the light-scattering material is essentially non-absorbing for light.

8. The fiber-optic component according to claim 1, wherein the light-scattering material is adapted to scatter light to all directions.

9. The fiber-optic component according to claim 1, further comprising at least one free space zone surrounding the first optical element between the housing, coupling zone and mounting zone.

10. The fiber-optic component according to claim 1, wherein there are at least two first optical elements being optical fibers, the at least two first optical elements being optically coupled to a single second optical element being an optical fiber.

11. The fiber-optic component according to claim 1, wherein the fiber-optic component is a fiber laser pump coupler or a N-to-1 fiber coupler, where $N \geq 2$.

12. A method of manufacturing a fiber-optic component, comprising
   providing a housing,
   providing a fiber-optic coupler comprising at least one first optical element capable of guiding light and having an output end and at least one second optical element optically coupled to the first optical element at a coupling zone for receiving light from the output end of the first optical element,
   mounting the fiber optic coupler to the housing by affixing the first optical element to the housing by a mounting zone, and
   providing at least one zone of light-scattering material in the vicinity of the first optical element at a region between the coupling zone and the mounting zone, said light-scattering material comprising a particle-type light-scattering agent forming a porous structure.

13. The method according to claim 12, wherein said zone of light-scattering material is provided by introducing a mixture of at least partly volatile matrix material and particle-type scattering agent to a cavity remaining between the housing and the first optical element, volatilizing at least part of the matrix material so as to form said porous structure of particle-type scattering agent to the cavity.

* * * * *